Figure 1:
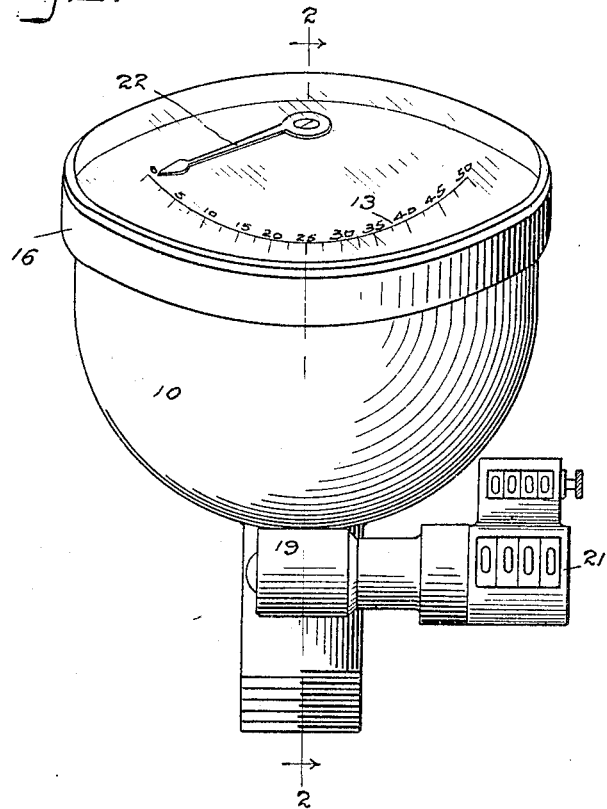

No. 844,684.  
PATENTED FEB. 19, 1907.

G. LOMBARDI.  
SPEEDOMETER.  
APPLICATION FILED SEPT. 24, 1906.

2 SHEETS—SHEET 1.

WITNESSES  
H. A. Lamb.  
S. W. Atherton.

INVENTOR  
Giovanni Lombardi  
BY  
A. M. Wooster  
ATTORNEY

No. 844,684. PATENTED FEB. 19, 1907.
G. LOMBARDI.
SPEEDOMETER.
APPLICATION FILED SEPT. 24, 1906.

2 SHEETS—SHEET 2.

WITNESSES
H. A. Lamb
S. W. Atherton

INVENTOR
Giovanni Lombardi
BY
N. M. Brooster
ATTORNEY

UNITED STATES PATENT OFFICE.

GIOVANNI LOMBARDI, OF DERBY, CONNECTICUT.

SPEEDOMETER.

No. 844,684.      Specification of Letters Patent.      Patented Feb. 19, 1907.

Application filed September 24, 1906. Serial No. 336,080.

*To all whom it may concern:*

Be it known that I, GIOVANNI LOMBARDI, a citizen of the United States, residing at Derby, county of New Haven, State of Connecticut, have invented a new and useful Speedometer, of which the following is a specification.

This invention has for its object to simplify and cheapen the construction and to greatly improve the operation of centrifugal speed-indicators or speedometers—that is, instruments for indicating the speed of vehicles, shafts, and other moving bodies.

With this and other objects in view I have devised the novel speedometer of which the following description, in connection with the accompanying drawings, is a specification, reference characters being used to indicate the several parts.

Figure 4:
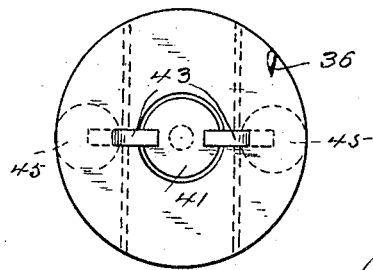
Figure 2:
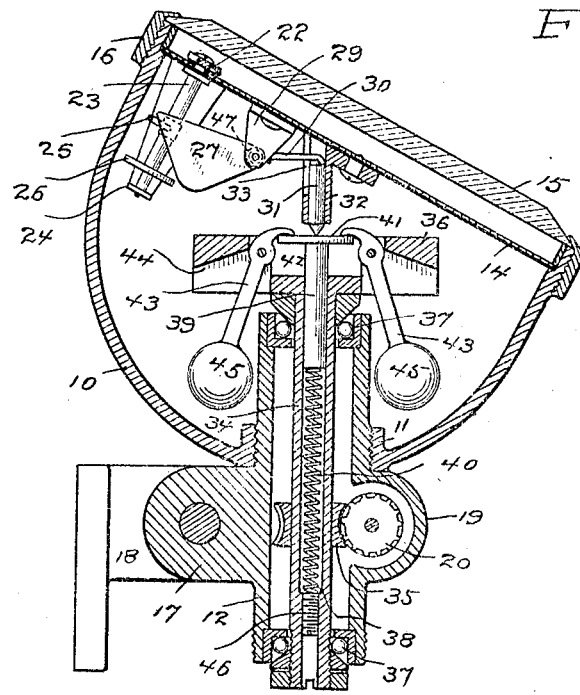
Figure 3:
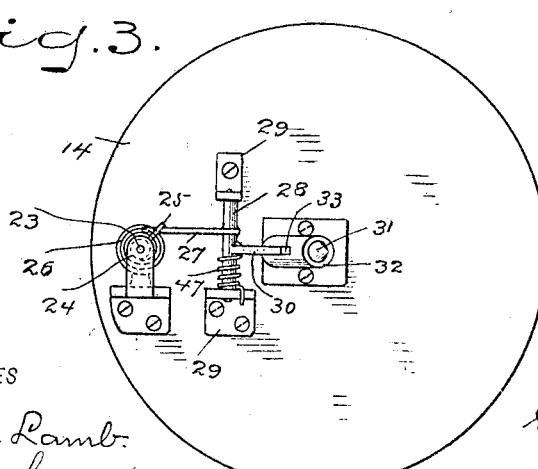

Figure 1 is an elevation of my novel speedometer, showing in connection therewith an odometer; Fig. 2, a section on the line 2 2 in Fig. 1 looking in the direction of the arrows; Fig. 3, an inverted plan view of the face-plate, showing the parts carried thereby; and Fig. 4 is a plan view of parts within the case which coact with the parts carried by the face-plate.

10 denotes the case, which is hemispherical in form and the bottom of which is provided with an opening at one side of the center, which is surrounded by a flange 11, both opening and flange being internally threaded to engage a corresponding external thread on a standard 12. The standard is secured in the opening obliquely to the axis of the case, so that the case in use is tilted. Supposing the standard to be fixed in the vertical plane, the case will lie obliquely to the vertical plane, so as to expose a dial 13 on a top plate 14, which is secured in any suitable manner in the upper edge of the case.

15 denotes a crystal or plate of glass which covers the dial, leaving a space between them, and is shown as secured to the case by a flanged ring 16, engaging the outer side of the case.

The standard is shown as provided with an ear 17 to adapt it for attachment to any suitable part, as to a bracket 18. The standard is also shown as provided with an enlargement 19 to receive the operating-gear 20 of an odometer, which is indicated as a whole by 21.

The essential features of the present invention are the parts carried by the face-plate.

22 denotes the pointer, which is carried by a shaft 23, journaled at one side of the face-plate and extending downward into the case, the lower end thereof being stepped in a bracket 24, which is secured to the face-plate. 25 denotes an arm extending from the pointer-shaft, and 26 a light spring connected to the shaft and to the bracket, the action of which is to turn the shaft and carry the pointer toward the right from the position shown in Fig. 1—that is, toward the graduations indicating high speed. 27 denotes a cam carried by a shaft 28, journaled in brackets 29, secured to the face-plate, the operative face of which is engaged by the arm 25, extending from the pointer-shaft. An arm 30, extending from the cam-shaft, bears against the end of a plunger 31, which reciprocates freely in a socket 32, secured to the face-plate obliquely to the plane thereof and in such a position that said plunger will lie in alinement with the axis of the standard. The socket is provided with a slot 33, through which arm 30 passes. A spring 47 on shaft 28 acts to retain arm 30 in engagement with the end of plunger 31 and also to retain the cam in operative position.

The special form of operating connections is unimportant so far as the principle of the invention is concerned. In the present instance I have illustrated mechanism operating on the principle of a centrifugal governor. 34 denotes a shaft mounted to rotate freely in the standard, to which a flexible or other shaft (not shown) is connected in any suitable manner. Shaft 34 carries a gear 35, which meshes with gear 20 to operate the odometer, and carries at its upper end a plate 36. 37 denotes ball-bearings for shaft 34, and 38 a longitudinal opening in said shaft. 39 denotes a plunger in opening 38, which rests upon a spring 40 and carries at its upper end a plate 41, which lies in a recess 42 in plate 36 and is engaged by plunger 31. 43 denotes levers pivoted in recesses 44 in plate 36, the relatively short upper arms of which are curved inward to adapt them to bear upon the top of plate 41 and the relatively long lower arms of which carry weights 45. The lower end of spring 40 rests upon an adjusting-screw 46, by means of which the tension of the spring may be regulated.

Heretofore, so far as I am aware, in instruments of this character mechanism has been provided the operation of which has been to move the pointer to indicate an increase in speed. In the present construction, however, the pointer-spring normally moves the pointer in the direction to indicate high speed, and the pointer is normally held at zero against the power of the counter-spring through the engagement of cam 27 with the arm 25, extending from the pointer-shaft.

The operation is as follows: In the normal or inoperative position the weights cause levers 43 to hang vertically, and spring 40 raises plunger 39 and plate 41 upward to the extreme of their movement. Plate 41 raises plunger 31, which in turn tilts arm 30, oscillates the cam-shaft, and places the cam in the position shown in Fig. 2. The cam in turn bears upon arm 25, extending from the pointer-shaft, and turns the shaft to a position to place the pointer at zero on the dial. In order to place the parts in this position, it will be apparent that spring 47 must be strong enough to overcome the power of spring 26, so that movement of the cam to its normal position will place the pointer in its normal position—that is, at zero on the dial—against the power of spring 26, and that spring 40 must readily overcome the power of spring 47 in order to control the cam. In use rotation of shaft 34 will cause the weights to fly outward by centrifugal power, and the curved upper arms of the levers will force plate 41 and plunger 39 downward against the power of spring 40, which will permit plunger 31 to move downward and will cause spring 47 to turn the cam-shaft and swing the cam, thereby relieving the pressure of the cam on arm 25, extending from the pointer-shaft, and permitting spring 26 to turn the pointer-shaft and swing the pointer in the direction to indicate speed. It should be understood that the movements of the pointer to indicate speed are controlled by the pointer-spring and that the operation of the intermediate connections, controlled in the present instance by shaft 28, is to relieve the retaining pressure of the cam which has retained the pointer at zero, so that when the pressure is relieved the pointer, in fact, follows the cam instead of being operated by the cam. I thus insure a much steadier movement of the pointer than is possible where the pointer is operated directly by actuating connections.

Having thus described my invention, I claim—

1. An instrument of the character described comprising a pointer, a shaft by which said pointer is carried and which is provided with an outwardly-extending arm, a spring normally acting to move said shaft and pointer in the direction to indicate speed, a cam engaging said arm and acting to retain the shaft and pointer at their normal position against the power of the spring, a shaft by which said cam is carried, an arm extending from said shaft, a plunger engaging said arm and acting to retain the shaft and cam in the normal position, and a spring on said shaft of greater power than the pointer-spring by which the shaft, arm and cam are retained in operative position.

2. An instrument of the character described comprising a pointer, a spring normally acting to move said pointer in the direction to indicate speed, means for retaining the pointer at its normal position against the power of the spring, and operating means comprising a shaft carrying a plate 36, levers pivoted in said plate and carrying weights and a spring-controlled plunger in said shaft carrying a plate 41 which is engaged by the short arms of the levers and the pointer-retaining means, so that when the shaft is rotated the weights will swing outward and the short arms of the levers will force plate 41 and the plunger downward, whereby the tension on the pointer-spring is relieved and the pointer is caused to indicate the speed.

3. The combination with the hemispherical case 10 having an opening at one side of the center of the bottom, of a standard secured in said opening obliquely to the axis of the case so that when the standard is fixed in the vertical plane the case will lie obliquely to the vertical plane, substantially as described, for the purpose specified.

4. The combination with a hemispherical case having an opening at one side of the bottom, a standard secured in said opening obliquely to the axis of the case, a face-plate secured in the case and provided with a dial, a pointer, a shaft by which the pointer is carried and which is journaled in the face-plate, and a spring normally acting to move said shaft and pointer in the direction to indicate speed, of a hollow shaft mounted to rotate in the standard, a spring-controlled plunger in said shaft carrying a plate 41, levers carried by the shaft whose short arms engage the plate and whose long arms are provided with weights, and intermediate connections between the plunger and the pointer-shaft, whereby when the hollow shaft is rotated the tension on the pointer-spring is relieved and the pointer is caused to indicate the speed.

5. In an instrument of the character described the combination with the standard, an odometer and a speedometer carried thereby, of a hollow shaft mounted to rotate in the standard and carrying an operating-gear for the odometer, and speedometer operating mechanism also carried by the shaft and comprising a spring-controlled plunger carrying a plate, levers whose short arms are curved to engage the plate and weights upon the long arms of the levers, substantially as described, for the purpose specified.

6. In an instrument of the character described the combination with a standard and a hollow shaft mounted to rotate therein, of a plunger in said shaft carrying a plate, levers whose short arms are curved to engage the plate, weights upon the long arms of the levers, a spring on which the plunger rests and an adjusting-screw for regulating the tension of the spring.

7. An instrument of the character described comprising a case, a face-plate provided with a dial, a pointer, a shaft therefor journaled at one side of the face-plate and having an arm extending therefrom, a spring connected to said shaft and acting to move the pointer in the direction to indicate speed a cam engaging the arm by which the tension on the pointer-spring is controlled, and operating means acting upon the cam by which the tension of the pointer-spring is relieved as speed increases.

8 In an instrument of the character described the combination with a case set obliquely to the vertical plane and having a face-plate provided with a dial and operating connections, of a pointer, a shaft therefor journaled at one side of the face-plate and having an arm extending therefrom, a spring acting to move the pointer in the direction to indicate speed, a cam engaging said arm by which the tension of the spring is controlled, a shaft for said cam which is carried by the face-plate, an arm extending therefrom, a plunger engaged by said arm, and a socket for said plunger secured to the face-plate obliquely to the plane thereof.

In testimony whereof I affix my signature in presence of two witnesses.

GIOVANNI LOMBARDI.

Witnesses:
 DANIEL B. GIDDINGS,
 GEORGE H. KNEEN.